(12) United States Patent
Buchele et al.

(10) Patent No.: US 7,985,162 B2
(45) Date of Patent: Jul. 26, 2011

(54) SIGNAL TORQUE MODULE ASSEMBLY FOR USE IN CONTROL MOMENT GYROSCOPE

(75) Inventors: Paul Buchele, Glendale, AZ (US); Torey Davis, Peoria, AZ (US)

(73) Assignee: Honeywell International Inc., Morristown, NJ (US)

( * ) Notice: Subject to any disclaimer, the term of this patent is extended or adjusted under 35 U.S.C. 154(b) by 765 days.

(21) Appl. No.: 12/051,585

(22) Filed: Mar. 19, 2008

(65) Prior Publication Data
US 2009/0235765 A1 Sep. 24, 2009

(51) Int. Cl.
*F16H 37/06* (2006.01)
*F16H 38/40* (2006.01)
*G01C 19/06* (2006.01)

(52) U.S. Cl. ............................. 475/330; 475/150; 74/5.7

(58) Field of Classification Search .................. 74/84 R, 74/84 S, 5.22, 5.4, 5.47, 5.6 R, 5.6 D, 5.6 E, 74/5.7; 475/150, 329, 330, 903
See application file for complete search history.

(56) References Cited

U.S. PATENT DOCUMENTS

| | | | | |
|---|---|---|---|---|
| 2,746,300 A | * | 5/1956 | Seaman | 74/5.4 |
| 4,430,909 A | * | 2/1984 | Magnuson | 475/330 |
| 4,503,718 A | * | 3/1985 | Quermann | 74/5.46 |
| 6,135,392 A | | 10/2000 | Wakugawa | |
| 6,459,165 B1 | * | 10/2002 | Schoo | 290/1 C |
| 7,249,531 B2 | | 7/2007 | Defendini et al. | |

FOREIGN PATENT DOCUMENTS

| WO | 03080439 A1 | 10/2003 |
|---|---|---|
| WO | 2007022575 A1 | 3/2007 |

OTHER PUBLICATIONS

European search report for Application No. 09153465, mailed on Jul. 6, 2009.

* cited by examiner

*Primary Examiner* — Roger Pang
(74) *Attorney, Agent, or Firm* — Ingrassia Lorenz & Fisher

(57) ABSTRACT

A signal torque module assembly (STMA) is provided for use within a control moment gyroscope of the type that includes a rotor assembly. The STMA comprises a torque module assembly (TMA), which includes: (i) a TMA housing, (ii) a torque motor coupled to the TMA housing, and (iii) a gear train coupled to the TMA housing and mechanically coupling the torque motor to the rotor assembly. A signal module assembly is coupled to the TMA housing, and an elongated connector electrically couples the signal module assembly and the rotor assembly. The elongated connector extends through the gear train.

19 Claims, 5 Drawing Sheets

SIGNAL TORQUE MODULE ASSEMBLY FOR USE IN CONTROL MOMENT GYROSCOPE

TECHNICAL FIELD

The present invention relates generally to rotational devices and, more particularly, to signal torque module assembly suitable for employment within the stator assembly of a control moment gyroscope.

BACKGROUND

Control moment gyroscopes (CMGs) are commonly employed in satellite attitude control systems. A generalized CMG comprises a stator assembly that supports a rotor assembly. Among other components, the stator assembly includes a torque module assembly (TMA) and a signal module assembly (SMA). The TMA and SMA are discrete devices, which are mounted to opposing end portions of the stator assembly's housing. The TMA includes a torque motor that is mechanically coupled to the rotor assembly by way of a gear train. When the torque motor is energized, the TMA rotates the rotor assembly about a gimbal axis. The SMA may comprise a slip ring assembly that is electrically coupled to the rotor assembly via an elongated connector. During operation of the CMG, the SMA permits electrical signals and/or power to be transferred across the SMA's rotary interface and to the rotor assembly's electrical components (e.g., spin motors).

CMGs of the type described above have been extensively engineered and are well-suited for use within spacecraft attitude control systems. Nonetheless, conventional CMGs are still associated with a number of limitations related to the torque and signal module assemblies. For example, although achieving a relatively high torque output, conventional TMAs may be relatively bulky and heavy. Furthermore, due to the expansive dimensions of the TMA and the asymmetrical support of the gears within the TMA housing, the gear teeth in the TMA drive train may wear unevenly over time thus shortening the TMA's operational lifespan. As a still further limitation, conventional CMG designs do not provide an efficient means for routing the elongated connector from the SMA to the rotor assembly.

It should thus be appreciated that it would be desirable to provide a CMG stator assembly including a TMA having a high torque output that is relatively compact and lightweight. Ideally, such a TMA would provide radially balanced gear tooth loading so as to improve tooth wear characteristics. It would also be desirable to provide integrated torque module and signal module assemblies (collectively referred to herein as a signal torque module assembly or STMA) so as to streamline the CMG envelope and localize mass. Preferably, such an STMA would provide an efficient routing means to accommodate the elongated electrical connector coupling the SMA to the rotor assembly. Other desirable features and characteristics of the present invention will become apparent from the subsequent detailed description of the invention and the appended claims, taken in conjunction with the accompanying drawings and this background of the invention.

BRIEF SUMMARY

A signal torque module assembly (STMA) is provided for use within a control moment gyroscope of the type that includes a rotor assembly. The STMA comprises a torque module assembly (TMA), which includes: (i) a TMA housing, (ii) a torque motor coupled to the TMA housing, and (iii) a gear train coupled to the TMA housing and mechanically coupling the torque motor to the rotor assembly. A signal module assembly is coupled to the TMA housing, and an elongated connector electrically couples the signal module assembly and the rotor assembly. The elongated connector extends through the gear train.

A stator assembly is also provided for deployment within a control moment gyroscope of the type which includes a rotor assembly. The stator assembly comprises a torque module assembly (TMA) and a stator assembly housing, which is rotatably coupled to the rotor assembly. The TMA includes: (i) a TMA housing mounted to the stator assembly housing, (ii) a torque motor coupled to the TMA housing, (iii) a gear train disposed in the TMA housing and mechanically coupling the torque motor to the rotor assembly, and (iv) a longitudinal channel extending through the gear train. A signal module assembly (SMA) is coupled to the TMA housing, and an elongated connector electrically couples the SMA and the rotor assembly. The elongated connector extends through the longitudinal channel.

BRIEF DESCRIPTION OF THE DRAWINGS

At least one example of the present invention will hereinafter be described in conjunction with the following figures, wherein like numerals denote like elements, and.

DETAILED DESCRIPTION OF AT LEAST ONE EXEMPLARY EMBODIMENT

The following Detailed Description is merely exemplary in nature and is not intended to limit the invention or the application and uses of the invention. Furthermore, there is no intention to be bound by any theory presented in the preceding Background or the following Detailed Description.

Figure 1:
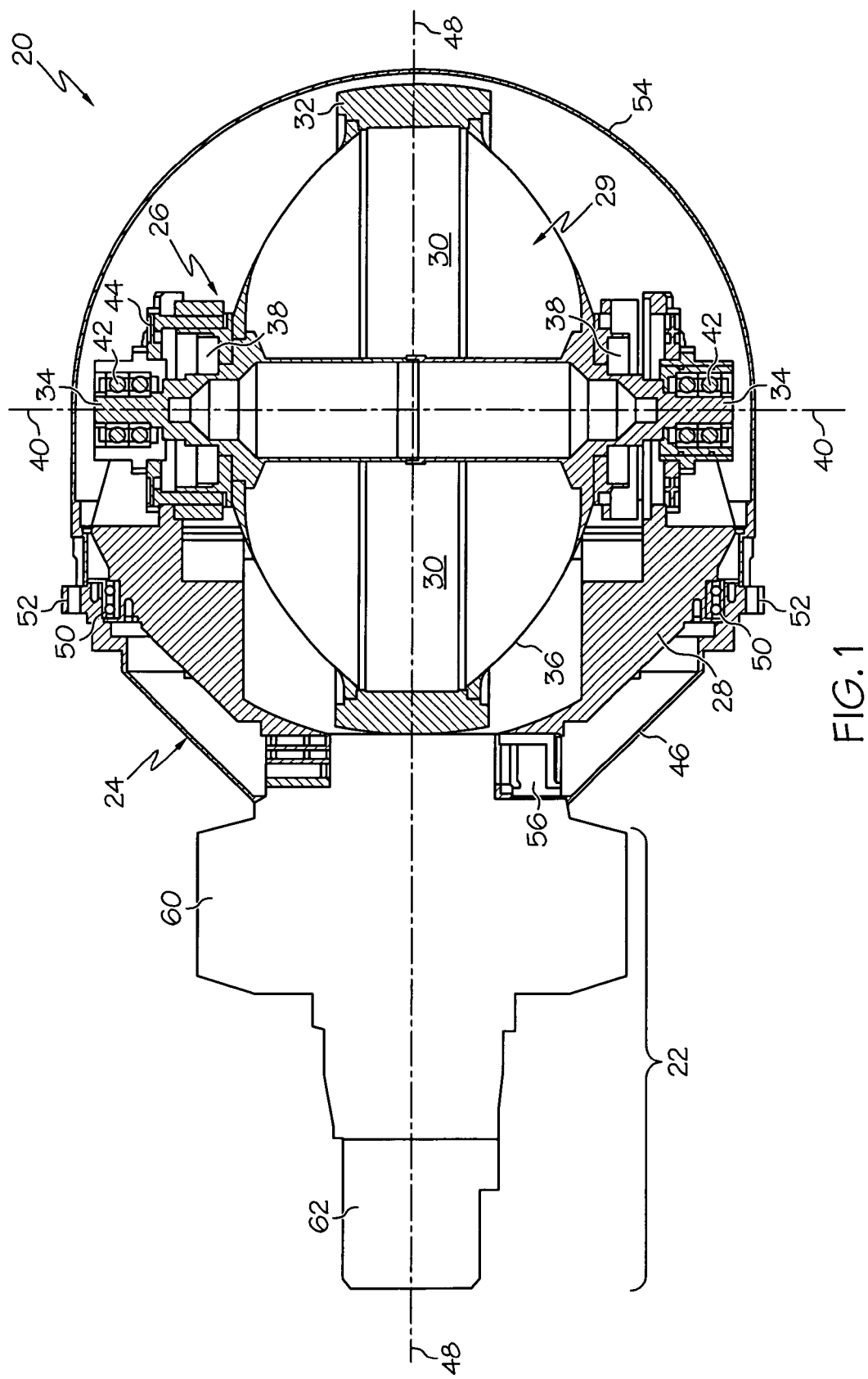
FIG. 1 is a cross-sectional view of a control moment gyroscope (CMG) in accordance with a first exemplary embodiment.

FIG. 1 is cross-sectional view of a CMG 20 including a generalized signal torque module assembly (STMA) 22 in accordance with a first exemplary embodiment. The design and function of STMA 22 will be described in detail below in conjunction with FIGS. 2-5; first, however, a general discussion of the various components of CMG 20 is provided. Of course, CMG 20 is but one example of a particular control moment gyroscope in which STMA 22 may be employed. Embodiments of STMA 22, and the torque module assembly employed thereby, may also be incorporated into various other types of gyroscopes and rotational devices.

With reference to FIG. 1, CMG 20 comprises two main assemblies, namely: (1) a stator assembly 24, which includes STMA 22; and (2) an inner gimbal assembly (IGA) 26. IGA 26 includes a rotor assembly housing 28 to which a rotor assembly 29 is coupled. Rotor assembly 29 may comprise, for example, a rotor 30 that includes an inertial element 32 (e.g., a composite ring) coupled to a shaft 34 by way of a rotor shell 36. The opposing ends of shaft 34 are each received in a different annulus provided within rotor assembly 29. A spin motor 38 is disposed around each end portion of shaft 34 and, when energized, rotates rotor 30 about a spin axis 40. First and second spin bearings 42 (e.g., a fixed duplex bearing cartridge and a floating duplex bearing cartridge) may be disposed around opposing end portions of shaft 34 to facilitate the rotation movement of rotor 30. IGA 26 may further comprise various other components that are standard in the industry and not described herein in the interests of concision, such as a tuned diaphragm 44 and heaters (not shown).

Stator assembly 24 includes a stator assembly housing 46, which supports rotor assembly housing 28 and, more generally, IGA 26. During the operation of CMG 20, STMA 22 selectively rotates IGA 26 about a gimbal axis 48. A gimbal bearing 50 (e.g., a large-bore duplex bearing) is disposed between stator assembly housing 46 and rotor assembly housing 28 to minimize friction as IGA 26 is rotated about gimbal axis 48. To detect the rotational rate and/or angular position of IGA 26, CMG 20 may be equipped with one or more sensors, such as a tachometer, a resolver, or the like. For example, as shown in FIG. 1, a rotary encoder 56 may be disposed within stator assembly housing 46 between STMA 22 and IGA 26 to monitor the rate and/or position of IGA 26.

To permit CMG 20 to be mounted to a spacecraft, a spacecraft interface 52 is provided on the exterior of stator assembly housing 46. Spacecraft interface 52 may comprise, for example, an annular structure having a plurality of bolt apertures therethrough that may be bolted directly onto the wall of a spacecraft or, instead, bolted to an intermediary mounting structure that is, in turn, mounted on the spacecraft. To impart a desired torque to the host spacecraft, STMA 22 selectively rotates IGA 26, and thus rotor 30, about gimbal axis 48. Rotor 30 is of sufficient mass and is spinning at such a rate that movement of rotor 30 out of its plane of rotation induces a significant torque about an output axis that is normal to both spin axis 40 and gimbal axis 48. This torque is transmitted from CMG rotor 30; through spin bearings 42, rotor assembly housing 28, gimbal bearing 50, and stator assembly housing 46; and to spacecraft interface 52 to impart a desired gyroscopic torque to the host spacecraft.

In the illustrated exemplary embodiment, stator assembly 24 is shown to include a stator cover 54 that sealingly encloses IGA 26. Stator cover 54 permits near-vacuum conditions to be created within stator assembly 24 during the ground testing of CMG 20. Stator cover 54 is, of course, unnecessary to the operation of CMG 20 when deployed in space. Thus, in alternative embodiments, CMG 20 may not include stator cover 54. However, if provided, stator cover 54 is not required to support any additional components of CMG 20; nor is stator cover 54 required to provide a path for transmitting torque or conducting heat away from rotor 30. Thus, stator cover 54 may be designed to be relatively thin-walled and have a perfect or nearly perfect hemi-spherical shape to minimize the overall volume and weight of CMG 20.

Referring still to FIG. 1, STMA 22 comprises a torque module assembly (TMA) 60 and a signal module assembly (SMA) 62. TMA 60 is mounted to an end portion of stator assembly housing 46, and SMA 62 is mounted to an end portion of TMA 60 substantially opposite stator assembly housing 46. TMA 60 is thus positioned between SMA 62 and IGA 26. As will be described below in detail, TMA 60 operates to selectively rotate IGA 26 about gimbal axis 48. In comparison, SMA 62 functions to transmit electrical signals and/or power from electrical components mounted to stator assembly 24 or to the host spacecraft (e.g., a power source), across a rotary interface, and to the electrical components integrated into IGA 26 (e.g., spin motors 38). Although SMA 62 may assume the form of any body or device or body suitable for performing this function, SMA 62 preferably comprises a slip ring assembly of the type described below in conjunction with FIGS. 2 and 3.

Figure 2:
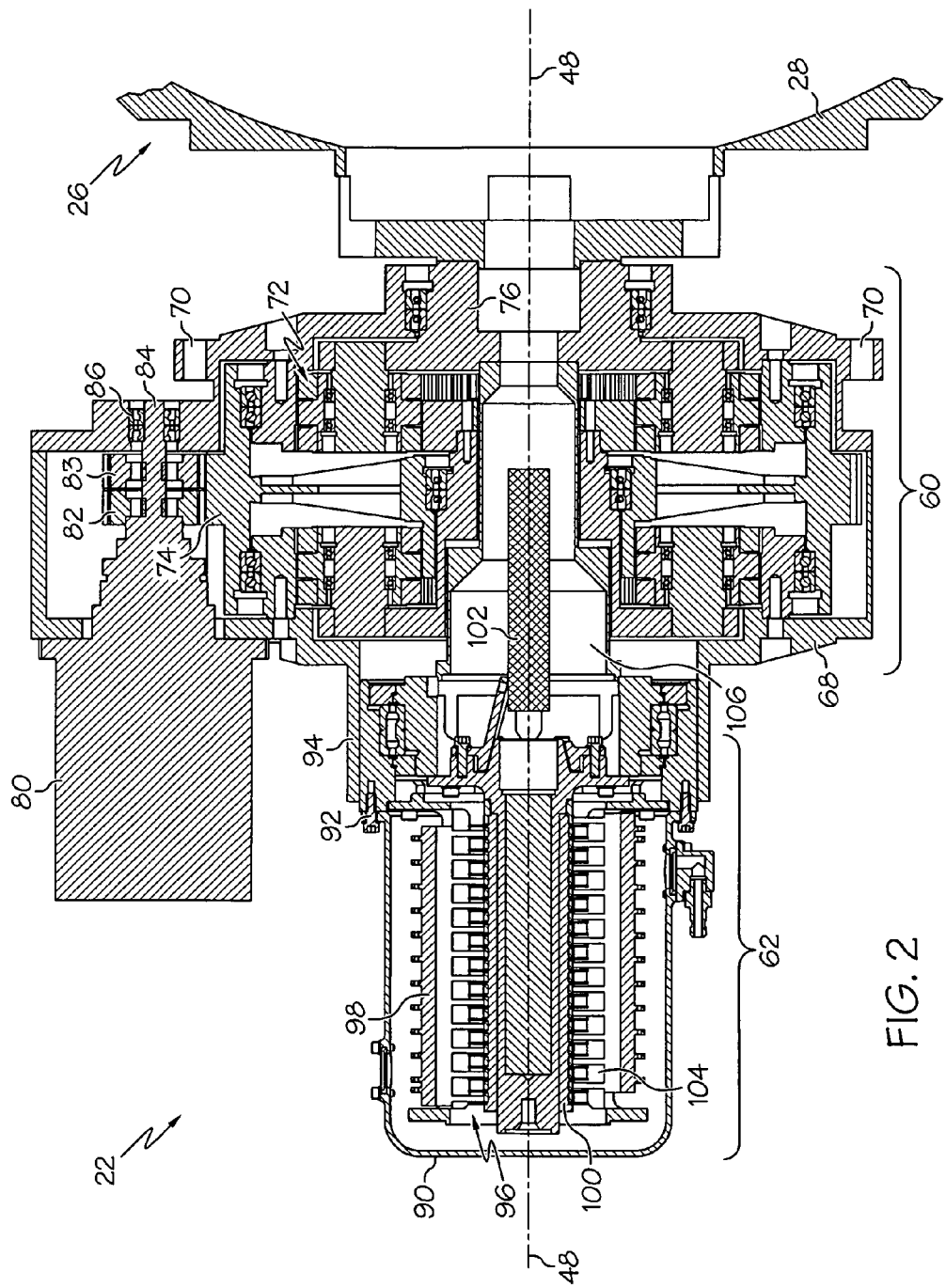
FIGS. 2 and 3 are detailed cross-sectional and isometric views, respectively, of an exemplary signal torque module assembly (STMA) that may be employed by the stator assembly of the CMG shown in FIG. 1.
Figure 3:
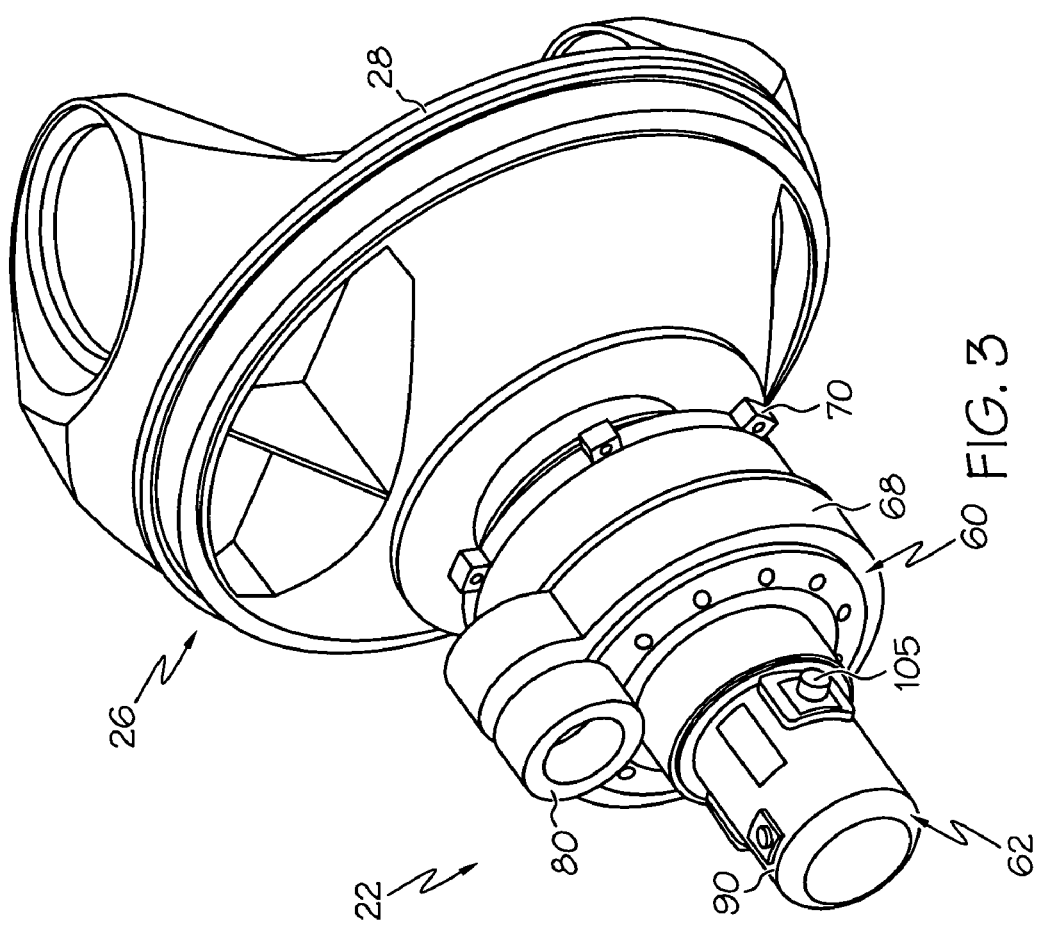

FIGS. 2 and 3 are detailed cross-sectional and isometric views, respectively, of STMA 22 coupled to rotor assembly housing 28. Referring first to FIG. 2, it can be seen that TMA 60 comprises a TMA housing 68 that includes stator assembly mounting interface 70 (e.g., a series of tabs each having a bolt aperture therethrough), which may be fixedly coupled (e.g., bolted) to stator assembly housing 46 (not shown for clarity). A torque motor 80 (only partially shown in FIG. 3) is fixedly coupled to an outer portion of TMA housing 68, and a gear train 72 is disposed within TMA housing 68. Torque motor 80 includes a pinion 82, and gear train 72 includes a rotary input 74 and a rotary output 76. Rotary input 74 is engaged by pinion 82, and rotary output 76 is fixedly coupled (e.g., bolted) to rotor assembly housing 28. When torque motor 80 is energized, pinion 82 drives gear train 72 to thereby rotate rotor assembly housing 28, and thus IGA 26, about gimbal axis 48 as described in detail below. For increased stability and better tooth load distribution, pinion 82 may be provided with an extension 84 that is supported by an annular bearing 86 disposed within TMA housing 68. If desired, torque motor 80 may also include an anti-backlash gear 83 that engages, and is preloaded against, rotary input 74 of gear train 72 in the manner shown in FIG. 2.

SMA 62 comprises an SMA housing 90 that is fixedly coupled to an SMA mounting interface 92 provided on TMA housing 68 utilizing, for example, a plurality of bolts. If desired, TMA housing 68 may also be provided with an annular collar 94 that receives and supports SMA 62 when SMA 62 is mounted to TMA housing 68. A slip ring assembly 96 is mounted within SMA housing 90. Slip ring assembly 96 includes a slip ring stator 98 (e.g., a tubular body) and a slip ring rotor 100 (e.g., a rotatable shaft), which is disposed within slip ring stator 98. As described in more detail below, slip ring rotor 100 may be mounted to a tubular conduit (e.g., conduit 146 shown in FIG. 5), which is, in turn, mechanically coupled to rotary output 76 of TMA 60. Slip ring stator 98 is fixedly coupled to SMA housing 90, and slip ring rotor 100 may rotate within slip ring stator 98. An elongated connector 102 (e.g., a sheathed cable bundle) electrically couples slip ring rotor 100 to IGA 26. When IGA 26 rotates about gimbal axis 48, elongated connector 102 and slip ring rotor 100 rotate along therewith. A plurality of flexible conductive fingers 104 maintains electrical contact between slip ring rotor 100 and slip ring stator 98 as slip ring rotor 100 rotates with IGA 26. An SMA transfer connector 105 (shown in FIG. 3) disposed on the exterior of SMA housing 90 permits external electrical components (e.g., a power source) located on CMG 20 (FIG. 1) or on the host spacecraft to be electrically coupled to slip ring stator 98. In this manner, slip ring assembly 96 and elongated connector 102 permit electrical signals and/or power to be delivered to the rotor assembly's electrical components while IGA 26 rotates about gimbal axis 48.

A longitudinal channel 106 is formed through a central portion of gear train 72 to accommodate elongated connector 102. In a preferred embodiment, the longitudinal axis of longitudinal channel 106 is substantially co-linear with gimbal axis 48. The provision of longitudinal channel 106, and the overall design of STMA 22, permits elongated connector 102 to be routed through gear train 72 between SMA 62 and IGA 26 in a direct and efficient manner. This conductor routing scheme is significantly more efficient than conventional routing schemes and results in a significant reduction in the overall volume and weight of STMA 22.

There has thus been described an exemplary signal torque module assembly wherein the SMA is mounted to the TMA substantially opposite the rotor assembly. By integrating the SMA and TMA in this manner, the CMG envelope is minimized and mass is localized. In addition, gear train 72 permits torque motor 80 to be offset from the centerline of TMA 60 (i.e., the rotational axis of pinion 82 may be offset from gimbal axis 48), which enables the length of torque motor 80 to be increased, within certain limits, without negatively impacting the overall length of STMA 22. Gear train 72 may comprise any system of at least two gears suitable for mechanically linking torque motor 80 to rotor assembly housing 28. This notwithstanding, it is preferred that gear train 72 comprises a high torque output gear train that is relatively compact and lightweight. An example of such a preferred gear train will now be described in conjunction with FIGS. 4 and 5.

Figure 4:
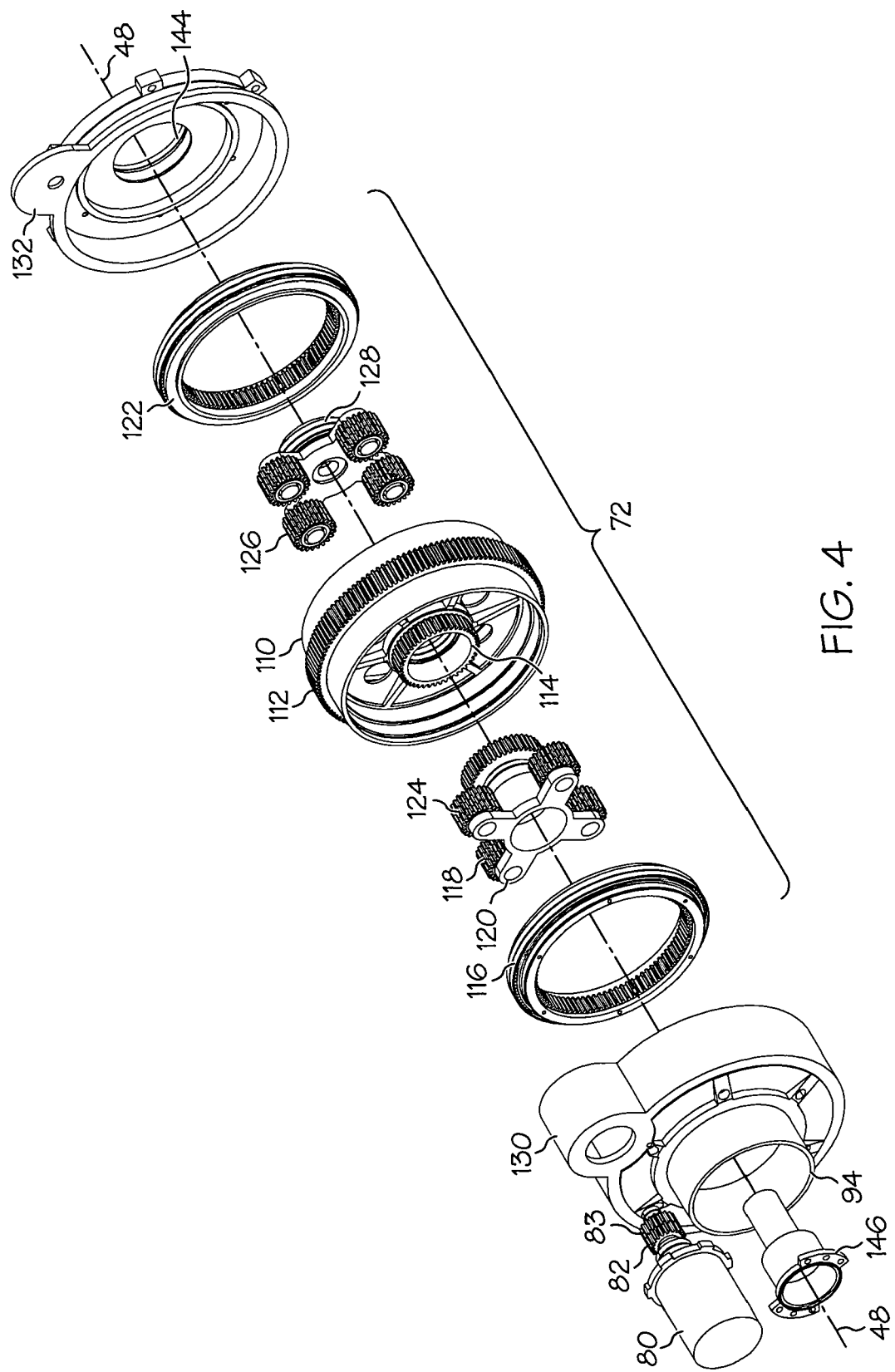
FIGS. 4 and 5 are exploded and isometric cutaway views, respectively, of the exemplary torque module assembly shown in FIGS. 2 and 3.
Figure 5:
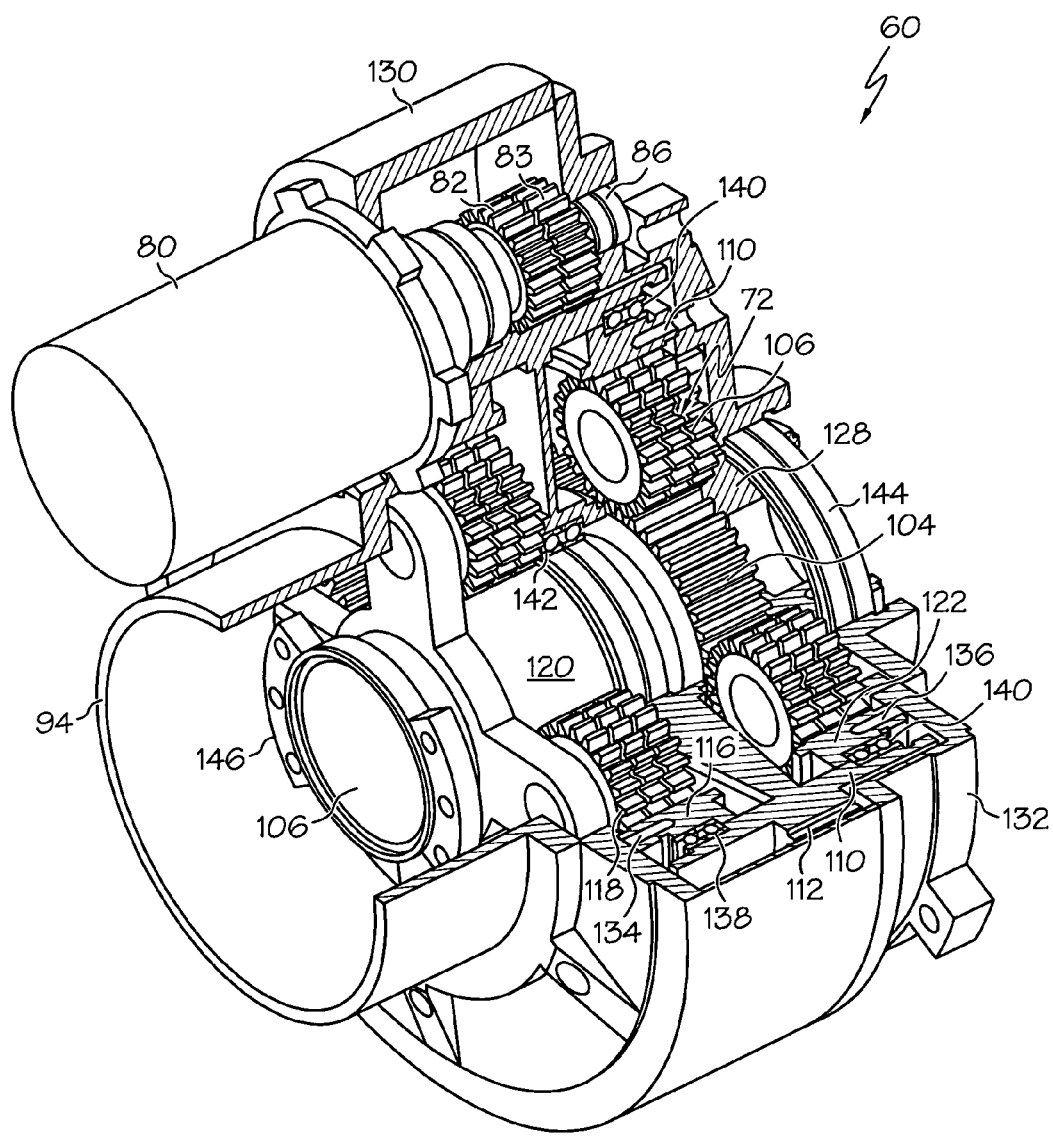

FIGS. 4 and 5 are exploded and isometric cutaway views, respectively, of TMA 60 illustrating gear train 72 in greater detail. Referring first to FIG. 4, gear train 72 comprises a rotatable drum 110 having an outer annular portion on which an outer spur gear 112 is formed, an inner annular portion on which a first sun gear 114 is formed, and a radial wall joining the outer portion and the inner portion. In the illustrated example, rotatable drum 110, outer spur gear 112, and first sun gear 114 are formed as a unitary machined piece, although it will be appreciated that this need not always be the case. In addition to these components, gear train 72 further includes: (1) a first outer ring gear 116, (2) a first set of planetary gears 118, (3) a first carrier 120 supporting planetary gears 118, (4) a second sun gear 124 fixedly coupled to first carrier 120, (5) a second set of planetary gears 126, (6) a second carrier 128 supporting planetary gears 126, and (7) a second outer ring gear 122. When gear train 72 is assembled, planetary gears 118 are radially disposed between sun gear 114 and ring gear 116, and planetary gears 126 are radially disposed between sun gear 124 and ring gear 122. As appearing herein the term "spur gear" is utilized in its broadest sense and defined to include, but not be limited to, various types of helical gears.

In a preferred embodiment, first and second sets of planetary gears 118 and 126 each comprise a plurality of spur gears circumferentially spaced about respective carriers 120 and 128 (and/or longitudinal channel 106). For example, and as indicated in FIGS. 4 and 5, each set of spur gears may include three gears, namely, a primary gear disposed between two anti-backlash gears. In the case of carrier 120, one of the anti-backlash gears engages, and is preferably preloaded against, first outer ring gear 116, while the other anti-backlash gear engages, and is preferably preloaded against, first sun gear 114. In the case of carrier 128 one of the anti-backlash gears engages, and is preferably preloaded against, outer ring gear 122, while the other anti-backlash gear engages, and is preferably preloaded against, sun gear 124.

The housing of TMA 60 comprises first and second portions 130 and 132. As shown in FIG. 5, housing portions 130 and 132 are fixedly coupled together to enclose gear train 72. Outer ring gears 116 and 122 are fixedly coupled to housing portions 130 and 132, respectively, utilizing a plurality of bolts (not shown) inserted into bolt apertures 134 and 136 (FIG. 5). To facilitate the rotational movement of drum 110, and thus outer spur gear 112 and first sun gear 114, a plurality of bearings (e.g., duplex ball bearings) may also be provided. For example, and as shown in FIG. 5, a first bearing 138 may be disposed between outer ring gear 116 and an outer portion of drum 110, a second bearing 140 may be disposed between outer ring gear 122 and an outer portion of drum 110, and a third bearing 142 may be disposed between carrier 120 and an inner portion of drum 110. In addition, an annular bearing 144 may be disposed between TMA housing portion 132 and carrier 128.

When TMA 60 is assembled, pinion 82 of torque motor 80 engages outer spur gear 112, which serves as the rotary input of gear train 72. As noted above, outer spur gear 112 is fixedly coupled to (e.g., integrally formed with) sun gear 114. Thus, as pinion 82 turns outer spur gear 112, sun gear 114 rotates along with outer spur gear 112. Sun gear 114 engages planetary gears 118, which are engaged by ring gear 116 and fixedly coupled to sun gear 124 via carrier 120. The rotation of sun gear 114 thus drives planetary gears 118 and sun gear 124. Sun gear 124 engages planetary gears 126, which are, in turn, engaged by ring gear 122 and supported by carrier 128. Thus, as sun gear 124 rotates, so too do planetary gears 126 and carrier 128. Carrier 128 is fixedly coupled to rotor assembly housing 28 (FIGS. 1-3) and serves as the rotary output of gear train 72. Consequently, the rotation of planetary gears 126 and carrier 128 results in the rotation of rotor assembly housing 28 about gimbal axis 48. In the illustrated example, carrier 120, sun gear 124, sun gear 114, outer spur gear 112, and carrier 128 rotate about a common rotational axis that is substantially co-linear with gimbal axis 48.

As previously stated, in the illustrated exemplary embodiment, first set of planetary gears 118 comprises a plurality of spur gears (e.g., four pairs of spur gears) that are circumferentially spaced about carrier 120 (and/or longitudinal channel 106). Similarly, second set of planetary gears 126 comprises a plurality of spur gears (e.g., four pairs of spur gears) that are circumferentially spaced about carrier 128 (and/or longitudinal channel 106). Due to this configuration, and the positioning of bearings 138 and 140, gear train 72 is evenly supported about its longitudinal axis and torque loads are radially distributed in a balanced manner. As a result, gear train 72 exhibits superior tooth wear characteristics and, ultimately, a longer operational lifespan.

As noted above, gear train 72 includes a longitudinal channel 106 therethrough that accommodates elongated connector 102 (FIG. 2). A number of the components within gear train 72 cooperate to form channel 106. For example, and as shown most clearly in FIG. 4, carriers 120 and 128 each have a longitudinal channel therethrough, and first sun gear 114 and second sun gear 124 each have a central opening therein. When TMA 60 is assembled, carrier 120 extends through the central opening provided in first sun gear 114 such that planetary gears 118 and sun gear 124 reside on opposite sides of the radial wall of drum 110 (i.e., carrier 120 includes a first end portion supporting planetary gears 118, an intermediate portion extending through the central opening provided in first sun gear 114, and a second end portion fixedly coupled to sun gear 124). The longitudinal openings formed through carriers 120 and 128, and the central openings provided through sun gears 114 and 124, cooperate to define longitudinal channel 106. If desired, a tubular conduit 146 may extend into the longitudinal channel provided through the body of carrier 120 as generally shown in FIGS. 4 and 5. As noted above, tubular conduit 146 may be mechanically coupled between rotary output 76 of TMA 60 and slip ring rotor 100 (shown in FIGS. 2 and 3). Slip ring rotor 100 may thus be configured to rotate along with rotary output 76 while SMA 62 (again, shown in FIGS. 2 and 3) is axially suspended within collar 94 of TMA housing 68. In this manner, radial loads experienced by SMA 62 (FIGS. 2 and 3) are imparted to TMA housing 68 through collar 94, and tubular conduit 146 serves to conducts axial loads from rotary output 76 to slip ring rotor 100.

There has thus been described an exemplary gear train 72 that may be employed by STMA 22. Due to its three-pass design, gear train 72 permits a relatively high gear ratio, and thus a relatively high torque output, to be attained. In one specific implementation of gear train 72, the torque motor pinion-to-outer ring, the first sun-to-planetary, and the second sun-to-planetary gear ratios may be 7.111:1, 3:1, and 3:1, respectively, yielding a total gear ratio of 64:1. Furthermore, as a result of its unique nested configuration, gear train 72 is lighter and more compact as compared to conventional sensor and torque module assemblies.

While at least one exemplary embodiment has been presented in the foregoing Detailed Description, it should be appreciated that a vast number of variations exist. It should also be appreciated that the exemplary embodiment or exemplary embodiments are only examples, and are not intended to limit the scope, applicability, or configuration of the invention in any way. Rather, the foregoing Detailed Description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A signal torque module assembly (STMA) for use within a control moment gyroscope of the type that includes a rotor assembly, the STMA comprising:
    a torque module assembly (TMA), comprising:
        a TMA housing;
        a torque motor coupled to the TMA housing; and
        a gear train coupled to the TMA housing and mechanically coupling the torque motor to the rotor assembly;
    a signal module assembly coupled to the TMA housing;
    an elongated connector electrically coupling the signal module assembly and the rotor assembly, the elongated connector extending through the gear train; and
    a longitudinal channel formed through a central portion of the gear train, the elongated connector extending through the longitudinal channel.

2. An STMA according to claim 1 wherein the signal module assembly is mounted to the TMA housing substantially opposite the rotor assembly.

3. An STMA according to claim 1 wherein the TMA is configured to rotate the rotor assembly about a gimbal axis, and wherein the longitudinal axis of the longitudinal channel is substantially co-linear with the gimbal axis.

4. An STMA according to claim 1 wherein the gear train comprises:
    a first planetary gear; and
    a first carrier supporting the first planetary gear, the longitudinal channel extending through the first carrier.

5. An STMA according to claim 4 further comprising an outer ring gear fixedly coupled to the TMA housing and engaging the first planetary gear.

6. An STMA according to claim 4 further comprising:
    an outer spur gear disposed within the TMA housing; and
    a sun gear fixedly coupled to the outer spur gear and engaging the first planetary gear.

7. An STMA according to claim 6 wherein the torque motor comprises a pinion engaging the outer spur gear, the pinion configured to rotate about a rotational axis offset from the gimbal axis.

8. An STMA according to claim 6 wherein the sun gear includes a central opening through which the first carrier extends.

9. An STMA according to claim 4 further comprising a first set of planetary gears including the first planetary gear, the first set of planetary gears circumferentially spaced about the longitudinal channel.

10. An STMA according to claim 9 wherein the gear train further comprises:
    a second set of planetary gears circumferentially spaced about the longitudinal channel; and
    a second carrier supporting the second set of planetary gears, the longitudinal channel passing through the second carrier.

11. An STMA according to claim 10 further comprising a sun gear fixedly coupled to the first carrier and engaging the second set of planetary gears.

12. A signal torque module assembly (STMA) for use within a control moment gyroscope of the type that includes a rotor assembly, the STMA comprising:
    a torque module assembly (TMA), comprising:
        a TMA housing;
        a torque motor coupled to the TMA housing; and
        a gear train disposed within the TMA housing, the gear train comprising:
            an outer spur gear engaging the torque motor;
            a first sun gear fixedly coupled to the outer spur gear, the first sun gear including a central opening therein;
            a first set of planetary gears engaging the first sun gear; and
            a first carrier supporting the first set of planetary gears, the first carrier extending through the central opening;
    a signal module assembly mounted to the TMA housing; and
    an elongated connector electrically coupling the signal module assembly to the rotor assembly.

13. An STMA according to claim 12 wherein the outer spur gear, the first sun gear, and the first carrier are configured to rotate about a substantially common rotational axis.

14. An STMA according to claim 12 wherein elongated connector extends through the first carrier.

15. An STMA according to claim 12 wherein the gear train further comprises a second sun gear, and wherein the first carrier comprises:
    a first end portion supporting the first set of planetary gears;
    an intermediate portion extending through the central opening; and
    a second end portion fixedly coupled to the second sun gear.

16. An STMA according to claim 12 wherein the gear train further comprises:
    a second sun gear fixedly coupled to the first carrier;
    a second set of planetary gears, the second set of planetary gears engaging the second sun gear; and
    a second carrier supporting the second set of planetary gears.

17. An STMA according to claim 16 wherein the gear train further comprises:
    a first outer ring gear fixedly coupled to the housing and engaging the first set of planetary gears; and
    a second outer ring gear fixedly coupled to the housing and engaging the second set of planetary gears;
    wherein the second set of planetary gears is radially disposed between the second sun gear and the second outer ring gear.

18. A stator assembly for deployment within a control moment gyroscope of the type which includes a rotor assembly, the stator assembly comprising:

a stator assembly housing rotatably coupled to the rotor assembly;

a torque module assembly (TMA), comprising:
- a TMA housing mounted to the stator assembly housing;
- a torque motor coupled to the TMA housing;
- a gear train disposed in the TMA housing and mechanically coupling the torque motor to the rotor assembly; and
- a longitudinal channel extending through the gear train;
- a signal module assembly (SMA) coupled to the TMA housing; and
- an elongated connector electrically coupling the SMA and the rotor assembly, the elongated connector extending through the longitudinal channel.

19. A stator assembly according to claim 18 wherein the TMA is positioned between the SMA and the stator assembly housing.

* * * * *